(12) United States Patent
Kim et al.

(10) Patent No.: US 10,075,920 B2
(45) Date of Patent: Sep. 11, 2018

(54) METHOD AND APPARATUS FOR CONTROLLING TRAFFIC IN ELECTRONIC DEVICE

(71) Applicant: Samsung Electronics Co., Ltd., Suwon-si, Gyeonggi-do (KR)

(72) Inventors: Jin-Hyoung Kim, Seoul (KR); Kill-Yeon Kim, Suwon-si (KR); Yong-Seok Park, Seoul (KR); Sang-Jun Moon, Yongin-si (KR); Young-Ki Hong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 231 days.

(21) Appl. No.: 14/156,979

(22) Filed: Jan. 16, 2014

(65) Prior Publication Data

US 2014/0198700 A1    Jul. 17, 2014

(30) Foreign Application Priority Data

Jan. 17, 2013   (KR) ........................ 10-2013-0005445

(51) Int. Cl.
   *H04W 52/02*   (2009.01)
   *H04L 12/875*  (2013.01)
   *H04L 29/06*   (2006.01)

(52) U.S. Cl.
   CPC ......... *H04W 52/0251* (2013.01); *H04L 47/56* (2013.01); *H04L 65/4023* (2013.01); *H04W 52/02* (2013.01); *Y02D 70/142* (2018.01)

(58) Field of Classification Search
   CPC ..... H04L 47/56; H04L 65/0423; H04L 47/60; H04L 65/4023; H04L 47/50; H04L 47/564; H04W 52/0254; H04W 52/0251; H04W 52/0216; H04W 52/0219; H04W 52/02; Y02B 60/50; Y02D 70/142
   (Continued)

(56) References Cited

U.S. PATENT DOCUMENTS 6,185,736 B1 *  2/2001  Ueno ................. H04L 12/5601
                                                 348/E7.071
6,816,456 B1 * 11/2004  Tse-Au ............... H04L 41/5054
                                                    370/230.1
(Continued)

FOREIGN PATENT DOCUMENTS

CN   100430897 C   11/2008
CN   102484857 A    5/2012
(Continued)

OTHER PUBLICATIONS

H. Andres Lagar-Cavilla et al., "Traffic Backfilling: Subsidizing Lunch for Delay-Tolerant Applications in UMTS Network", pp. 77-81.

*Primary Examiner* — Michael Thier
*Assistant Examiner* — Rownak Islam
(74) *Attorney, Agent, or Firm* — Jefferson IP Law, LLP

(57) ABSTRACT

A method for controlling traffic in an electronic device is provided. The method includes detecting a process request event for a first traffic, identifying whether the first traffic is allowed to be delayed, detecting whether a second traffic is generated if the first traffic is allowed to be delayed in a state where process of the first traffic is delayed, and processing the first traffic and the second traffic simultaneously if the second traffic is generated.

17 Claims, 14 Drawing Sheets

(58) Field of Classification Search
USPC .................................. 370/252, 311, 235, 230
See application file for complete search history.

(56) References Cited

U.S. PATENT DOCUMENTS

| | | |
|---|---|---|
| 2004/0223505 A1 | 11/2004 | Kim et al. |
| 2005/0188189 A1 | 8/2005 | Yeung et al. |
| 2006/0203737 A1 | 9/2006 | Bugenhagen |
| 2006/0268713 A1* | 11/2006 | Lundstrom ............ H04L 47/50 370/235 |
| 2006/0270385 A1* | 11/2006 | Morris ............ H04W 52/0203 455/405 |
| 2007/0206496 A1* | 9/2007 | Roy .................... G06F 13/4059 370/229 |
| 2009/0088199 A1 | 4/2009 | Nurminen et al. |
| 2009/0275354 A1* | 11/2009 | Bulmer ................ G06F 1/3203 455/522 |
| 2010/0091693 A1 | 4/2010 | Pelletier et al. |
| 2011/0019557 A1 | 1/2011 | Hassan et al. |
| 2011/0019693 A1* | 1/2011 | Fu ........................ H04L 69/32 370/469 |
| 2011/0055613 A1 | 3/2011 | Mandyam |
| 2011/0151944 A1 | 6/2011 | Morgan |
| 2011/0188424 A1 | 8/2011 | Ramamurthy et al. |
| 2011/0194429 A1 | 8/2011 | McWilliams et al. |
| 2011/0299454 A1 | 12/2011 | Krishnaswamy |
| 2012/0089720 A1 | 4/2012 | Tran et al. |
| 2012/0120829 A1 | 5/2012 | Blankenship et al. |
| 2012/0170496 A1 | 7/2012 | Yang et al. |
| 2012/0182916 A1 | 7/2012 | Pelletier et al. |
| 2012/0324102 A1 | 12/2012 | Lee et al. |
| 2012/0324267 A1 | 12/2012 | Mandyam |
| 2012/0327779 A1 | 12/2012 | Gell et al. |
| 2013/0215850 A1* | 8/2013 | Zakrzewski ...... H04W 52/0261 370/329 |
| 2013/0324104 A1* | 12/2013 | Cavilla ............ H04W 72/1242 455/422.1 |
| 2015/0296456 A1* | 10/2015 | Kaikkonen ....... H04W 52/0216 370/311 |

FOREIGN PATENT DOCUMENTS

| | | |
|---|---|---|
| CN | 102547939 A | 7/2012 |
| EP | 1475985 A2 | 10/2004 |
| WO | 03/096523 A1 | 11/2003 |
| WO | 2012019051 A1 | 2/2012 |

* cited by examiner

METHOD AND APPARATUS FOR CONTROLLING TRAFFIC IN ELECTRONIC DEVICE

CROSS-REFERENCE TO RELATED APPLICATION(S)

This application claims the benefit under 35 U.S.C. § 119(a) of a Korean patent application filed on Jan. 17, 2013 in the Korean Intellectual Property Office and assigned Serial number 10-2013-0005445, the entire disclosure of which is hereby incorporated by reference.

TECHNICAL FIELD

The present disclosure relates to a method and an apparatus for controlling traffic and reducing current consumption in an electronic device. More particularly, the present disclosure relates to a method for controlling traffic and reducing current consumption in an electronic device by efficiently using a limited battery capability.

BACKGROUND

As various types of portable electronic devices are increasingly used, limited battery life is more problematic. Since an electronic device has a plurality of functioning applications, traffic is frequently generated due to the plurality of functioning applications. Therefore, power charged in a battery is rapidly consumed. For example, the respective applications included in the electronic device may periodically generate traffic in order to maintain connection with a server or may generate traffic according to a request from a user or the server. The electronic device is in an active state during traffic generation, thereby consuming high-power. More particularly, the electronic device which is in the active state does not switch to an idle state at a time point which traffic generation is completed and examines whether traffic is again generated while maintaining the active state for a period of time. When traffic is not generated for the period of time, the electronic device switches to the idle state to consume low-power. For example, the electronic device which is in the active state consumes high-power for the period of time even though there is no traffic. The power unnecessarily consumed in a state which there is no traffic in the electronic device is referred to as a tail-end energy. When traffic is generated by the plurality of applications in the electronic device, the tail-end energy is frequently generated, thereby causing the increase of unnecessary power consumption. In addition, when traffic is generated in sequence by the plurality of applications in the electronic device, that is, traffic is generated by a specific application and traffic is sequentially generated by another application, the electronic device maintains the active state for a long time, thereby causing the increase of unnecessary power consumption.

Therefore, there is a need for a traffic control method and apparatus for reducing current consumption in an electronic device by efficiently using a limited battery capability by controlling traffic generated by a plurality of applications in an electronic device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a traffic control method and an apparatus for reducing current consumption in an electronic device.

Another aspect of the present disclosure is to provide a method and an apparatus for delaying traffic generated by a specific application and transmitting and receiving the traffic along with traffic generated by another application in an electronic device.

Another aspect of the present disclosure is to provide a method and an apparatus for discriminating delay-tolerant traffic from delay-sensitive interactive traffic and controlling the delay-tolerant traffic in an electronic device.

Another aspect of the present disclosure is to provide a method and an apparatus for delaying delay-tolerant traffic until interactive traffic is generated and transmitting and receiving the delay-tolerant traffic in an electronic device.

Another aspect of the present disclosure is to provide a method and an apparatus for delaying delay-tolerant traffic until interactive traffic is generated, transmitting and receiving the delay-tolerant traffic, and transmitting and receiving the delay-tolerant traffic according to a transmission state of the interactive traffic in an electronic device.

In accordance with an aspect of the present disclosure, a method for controlling traffic in an electronic device is provided. The method includes detecting a process request event for a first traffic, identifying whether the first traffic is allowed to be delayed, detecting whether a second traffic is generated if the first traffic is allowed to be delayed in a state where process of the first traffic is delayed, and processing the first traffic and the second traffic simultaneously if the second traffic is generated.

In accordance with another aspect of the present disclosure, an apparatus for controlling traffic in an electronic device is provided. The apparatus includes a transceiver unit configured to process traffic, and a scheduler configured to detect a process request event for a first traffic, identify whether the first traffic is allowed to be delayed, detect whether a second traffic is generated if the first traffic is allowed to be delayed in a state where process of the first traffic is delayed, and process the first traffic and the second traffic simultaneously if the second traffic is generated.

In accordance with another aspect of the present disclosure, a method for controlling traffic in an electronic device is provided. The method includes detecting performance of an application (app), outputting a screen for requesting settings for whether delay of traffic is allowed if an event requesting event process is detected through the app, setting whether the delay of traffic is allowed based on a user input, and determining a time point at which the traffic is processed based on a result of the setting of whether the delay of the traffic is allowed.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
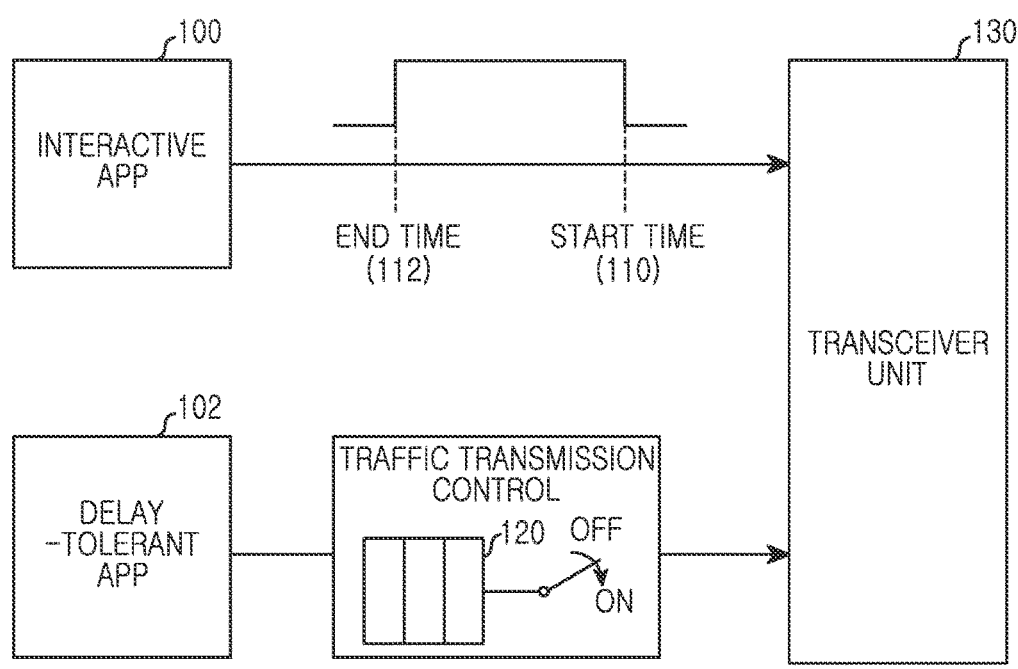
FIG. 1 illustrates a method for controlling traffic transmission according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The present disclosure provides a method for discriminating delay-tolerant traffic from delay-sensitive interactive traffic and controls delay-tolerant traffic in order to reduce current consumption in an electronic device. Herein, the delay-tolerant traffic refers to traffic which is not problematic when the user uses a relevant service even through data transmission and reception is performed, not immediately, but after several seconds or several hours when the user requests the service. For example, the delay-tolerant traffic refers to traffic generated by data transmission and reception for an e-mail, podcast downloading, content synchronization with a cloud server, content uploading, content downloading, software updating and maintenance of connection with the cloud server, and the like. In addition, interactive traffic refers to traffic for which data transmission and reception needs to be performed immediately when the user requests the service. For example, the interactive traffic refers to traffic generated by data transmission and reception due to a web browser, video viewing, music listening, games, and the like. Herein, traffic includes data and signals generated in order to transmit and receive the content and control signals of an application installed in the electronic device, and traffic transmission and reception includes transmission and reception of content or control signals.

In the following description, examples of the electronic device may include a mobile communication terminal, a smart phone, a tablet Personal Computer (PC), a digital camera, a Motion Pictures Expert Group (MPEG-1 or MPEG-2) Audio Layer 3 (MP3) player, a navigation device, a laptop computer, a laptop computer, a netbook, and the like.

FIG. 1 illustrates a method of controlling traffic transmission according to an embodiment of the present disclosure.

Referring to FIG. 1, the embodiment of the present disclosure classifies a plurality of applications (hereinafter, referred to as an "app" for convenience of explanation) into interactive apps 100 generating interactive traffic and delay-tolerant apps 102 generating delay-tolerant traffic. For example, the plurality of apps installed in the electronic device may be classified into an interactive app 100 and a delay-tolerant app 102 according to characteristics of traffic generated by respective apps of which classes may be determined in advance by a designer, a provider, a rule, and the like.

When an event for a request for traffic transmission and reception is generated by the delay-tolerant app 102, the electronic device according to various embodiments of the present disclosure does not process the request for traffic transmission and reception immediately and waits until traffic is generated by the interactive app 100. Thereafter, the electronic device transmits and receives traffic requested by the delay-tolerant app 102 at the time of transmission and reception of traffic by the interactive app 100. More specifically, the electronic device switches a traffic transmission state 120 to an on state at a time point 110 at which traffic transmission and reception starts by the interactive app 100 and transmits and receives traffic generated by the delay-tolerant app 102 through a transceiver unit 130. The electronic device switches the traffic transmission state 120 to an off state at a time point 112 at which traffic transmission and reception by the interactive app 100 is suspended, and stops traffic transmission and reception requested by the delay-tolerant app 102. In this case, transmitting traffic by the delay-tolerant app 102 not immediately but after delay until a traffic transmission time point by the interactive app 100 for reducing the number of times tail-end energy is generated, thereby reducing current consumption.

In addition, the electronic device determines a permissible delay time for traffic transmission and reception requested by the delay-tolerant app 102 and, when traffic is not generated by the interactive app 100 for the determined permissible delay time for transmission and reception, transmits and receives traffic requested by the delay-tolerant app 102 when the permissible delay time has expired. In this case, the permissible delay time may be previously determined by a designer or a provider or may be set by a user. In addition, the permissible delay time may be determined differently for respective apps.

The electronic device according to an embodiment of the present disclosure periodically examines the transmission state of the traffic by the interactive app 100 while delaying traffic by the delay-tolerant app 102 and transmitting and receiving the traffic by the delay-tolerant app 102 along with traffic generated by the interactive app 100 to determine whether to continuously perform or whether to stop traffic transmission and reception by the delay-tolerant app 102.

Figure 2:
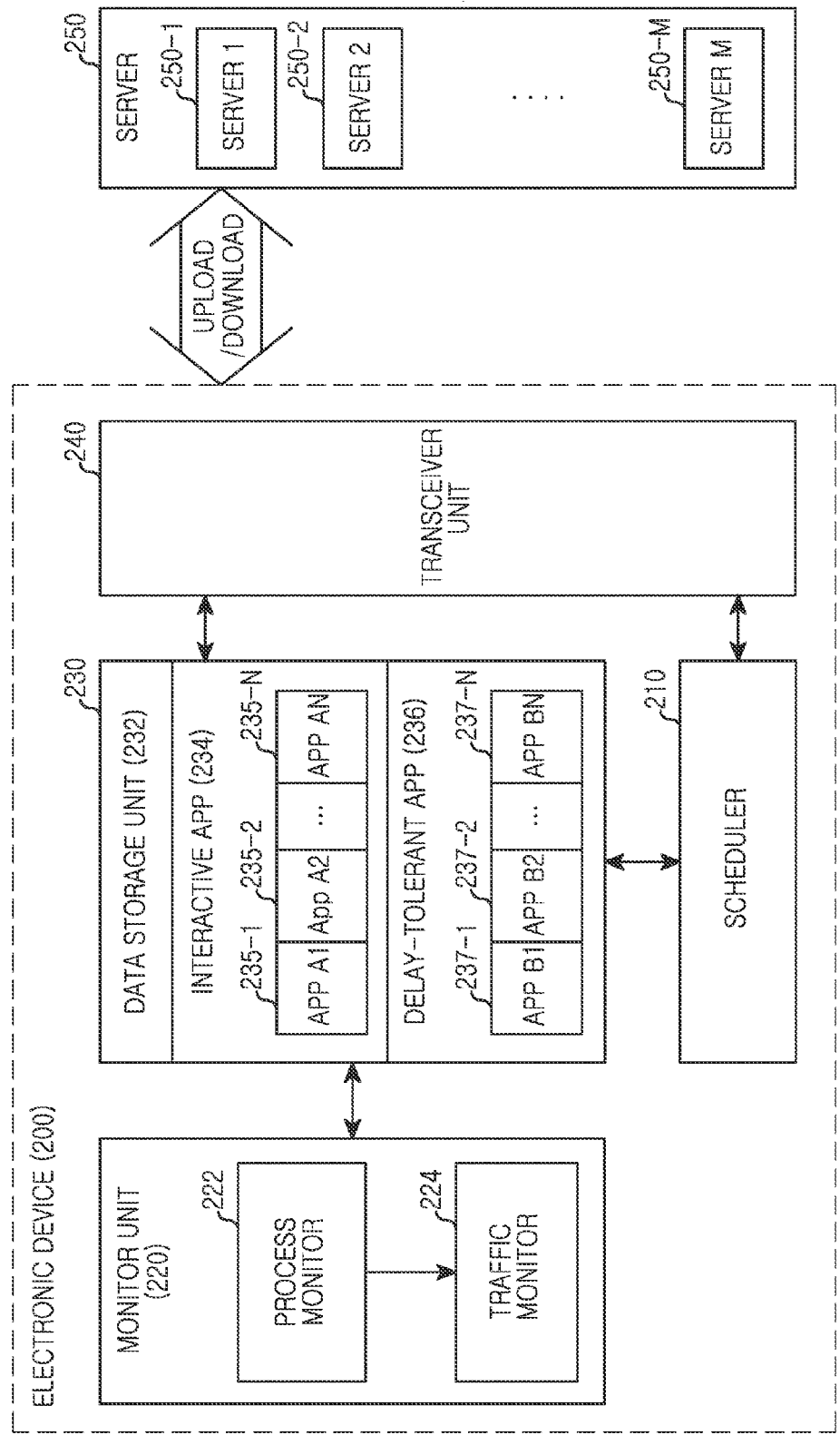
FIG. 2 illustrates a block configuration of an electronic device according to an embodiment of the present disclosure.

FIG. 2 illustrates a block configuration of an electronic device according to an embodiment of the present disclosure.

Referring to FIG. 2, an electronic device 200 includes a scheduler 210, a monitor unit 220, a memory 230, and a transceiver unit 240. Although content upload is taken as an example for convenience of explanation, the present disclosure may be applied to a case of downloading content or a case of transmitting a control signal (for example, a keep-alive signal) for connection with a server 250 in the same manner.

The scheduler 210 controls and processes the overall operation of the electronic device and performs a traffic control function according to various embodiments of the present disclosure. For example, when transmission for content is requested by a delay-tolerant app 236, the scheduler 210 temporarily stores a transmission request for relevant content in a queue (not illustrated) and requests the monitor unit 220 to detect traffic generation by an interactive app 234. Herein, the content may include messages, images, moving images, music, emails, and the like.

The scheduler 210 reads the content transmission request temporarily stored in the queue and controls and performs a function of transmitting content to the server 250 through the transceiver unit 240 when a signal representing that traffic is generated by the interactive app 234 is received from the monitor unit 220. In addition, the scheduler 210 temporarily stops transmission of content requested by the delay-tolerant app 236, stops traffic generation, and temporarily stores transmission state information when the signal representing that traffic is not generated by the interactive app 234 is received from the monitor unit 220 during transmission of content requested by the delay-tolerant app 236. Thereafter, the scheduler 210 may re-start transmission of content of the delay-tolerant app 236 based on temporarily stored transmission state information when the signal representing that traffic is generated by the interactive app 234 is re-received. According to another embodiment of the present disclosure, the scheduler 210 may continuously transmit content requested by the delay-tolerant app 236 and complete the transmission of the content even though the signal representing that traffic is generated by the interactive app 234 is again received from the monitor unit 220 during transmission of content requested by the delay-tolerant app 236. In addition, the scheduler 210 determines a permissible delay time of relevant content when transmission of the content is requested by the delay-tolerant app 236, and starts a timer for measuring the permissible delay time. The scheduler 210 may transmit the relevant content regardless of whether the traffic of the interactive app 234 is generated in a case where the relevant content is pending for transmission or when the transmission is temporarily suspended when the timer for measuring the permissible delay time has expired. Herein, the permissible delay time may be set by a designer, a provider, a user, and the like, and may be set differently for respective apps. In addition, the permissible delay time may be extracted from the content transmission request signal of the delay-tolerant app 236. The scheduler 210 transmits other content which is pending for transmission at a corresponding time while transmitting specific content regardless of traffic generation by the interactive app 234 when the timer for measuring a permissible delay time for a specific content has expired. For example, the scheduler 210 may start a second timer for a second content when the transmission of the second content is requested by a delay-tolerant app B2 237-2 during operation of the first timer for the first content requested for transmission by the delay-tolerant app B1 237-1. Thereafter, when any one of the first timer and the second timer has expired in a state where traffic is not generated by the interactive app 234, the scheduler 210 may transmit the first content and the second content.

Figure 10:
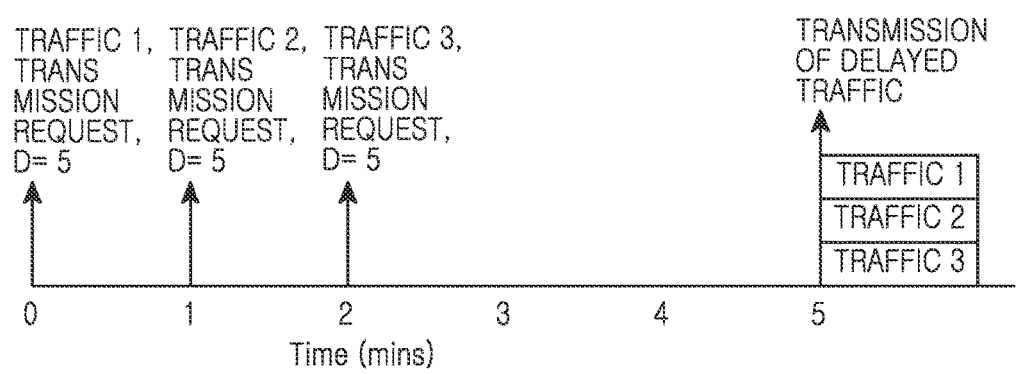
FIG. 10 illustrates a time point at which delay-tolerant traffic is processed in an electronic device according to an embodiment of the present disclosure.

FIG. 10 illustrates a time point at which delay-tolerant traffic is processed in an electronic device according to an embodiment of the present disclosure.

Referring to FIG. 10, for example, it may be assumed that transmission request events for the first traffic, the second traffic, and the third traffic are generated by the delay-tolerant app at different time points and respective permissible delay times for the first traffic, the second traffic, and the third traffic are 5minutes. When the permissible delay time for the first generated first traffic has expired, the scheduler 210 may transmit the second traffic and the third traffic with the first traffic even though the permissible delay times for the second traffic and the third traffic have not expired when the first traffic is transmitted.

In addition, the scheduler 210 may perform a function of enabling relevant traffic to be transmitted when a timer for measuring a permissible delay time has expired although the electronic device switches to a non-use state (for example, an idle state in which the screen of the electronic device is turned off). For example, a timer expiration time may be separately registered at the time of starting a timer for measuring a permissible delay time for a delay-tolerant traffic. In this case, the electronic device may switch to an active state and transmit the delay-tolerant traffic when the pre-registered timer has expired although the electronic device switches to the idle state in a case where the delay-tolerant traffic is not transmitted and is pending for transmission.

In addition, the scheduler 210 may continuously perform or temporarily stop content transmission of the delay-tolerant app 236 according to a traffic transmission and reception state for the interactive app 234 when the content of the delay-tolerant app 236 is transmitted and traffic is generated during generation of traffic by the interactive app 234. More specifically, the scheduler 210 controls the monitor unit 220 to estimate and determine traffic parameters representing a traffic transmission and reception state for the interactive app 234. When the traffic generation state is determined based on the traffic parameters, the scheduler 210 may continuously perform or temporarily stop the content transmission of the delay-tolerant app 236 according to the determined traffic generation state. In this case, the traffic parameter may include throughput, a delay, a jitter, a socket receive buffer state (for example, size of data stored in the socket receive buffer), and the like. For example, the scheduler 210 measures the traffic parameter at preset time periods and determines whether the traffic transmission and reception state of the interactive app 234 is affected by the content transmission of the delay-tolerant app 236 based on a traffic parameter at an N-th time point and a traffic parameter at an N+1-th time point to determine the traffic generation state representing a result of the determination. For example, the scheduler 200 may compare a difference value between throughput at the N-th time point and throughput at the N+1-th time point with threshold throughput and determine the traffic generation state according to a result of the comparison. In this case, the method for determining the traffic generation state will be described with reference to FIG. 6. Herein, the traffic generation state may represent whether the content of the delay-tolerant app 236 is allowed to be transmitted and received. For example, when the traffic generation state is in a "False" state, the traffic generation state may represent that the delay-tolerant traffic data is not allowed to be transmitted and received. When the traffic generation state is in a "True" state, the traffic generation state may represent that the delay-tolerant traffic data is allowed to be transmitted and received.

The monitor unit 220 examines whether traffic is generated by the interactive app 234 according to the request of the scheduler 210 and when traffic is generated by the interactive app 234, provides a signal representing the traffic generation to the scheduler 210. More specifically, the monitor unit 220 includes a process monitor 222 and a traffic monitor 224 to examine whether the interactive app 234 is performed and examine whether traffic is generated by the interactive app 234 that is performed. For example, when detection of traffic generation is requested from the scheduler 210, the monitor unit 220 executes the process monitor 222 and periodically examines whether at least one app 235-1 to 235-N corresponding to the interactive app 234 of a plurality of apps included in the electronic device 200 is performed using the executed process monitor 222. When performance of at least one app 235-1 to 235-N corresponding to the interactive app 234 is detected by the process monitor 222, the monitor unit 220 executes the traffic monitor 224 and periodically examines whether traffic is generated by at least one app 235-1 to 235-N that is being performed, by using the traffic monitor 224. When an app, which had not been performed, starts to be performed among apps 235-1 to 235-N corresponding to the interactive app 234, the process monitor 222 provides information about the app which starts to be performed to the traffic monitor 224. When an app, which had been performed, stops to be performed among apps 235-1 to 235-N corresponding to the interactive app 234, the process monitor 222 provides information about the app which stops to be performed to the traffic monitor 224. Therefore, the traffic monitor 224 examines whether traffic is generated with respect to the app which is being performed.

When the start of traffic generation by at least one app 235-1 to 235-N that is being performed is detected through the traffic monitor 224 or a situation where traffic is generated by at least one app 235-1 to 235-N is detected, the monitor unit 220 transmits a signal representing the situation where traffic is generated by at least one app 235-1 to 235-N to the scheduler 210 and when traffic generation by the interactive app 234 is terminated, transmits a signal representing the situation where traffic is not generated by the interactive app 234 to the scheduler 210. The monitor unit 220 may stop to execute the traffic monitor 224 when all apps 235-1 to 235-N corresponding to the interactive app 234 among the plurality of apps have not been performed. The monitor unit 220 may stop to execute the process monitor 222 when the signal representing that content transmission of the delay-tolerant app 236 has completed is received from the scheduler 210.

The memory 230 stores a data storage unit 232, the interactive app 234, and the delay-tolerant app 236. The memory 230 may store one or more programs including instructions according to various embodiments of the present disclosure.

The data storage unit 232 stores data generated during the performance of a function corresponding to a program or an app stored in the memory 230. The data storage unit 232 according to the present disclosure may store various pieces of content and permissible delay time information for respective apps 237-1 to 237-N corresponding to the delay-tolerant app 236. The data storage unit 232 may store information and/or rules used to classify the plurality of apps into the interactive app 234 and the delay-tolerant app 236 in the electronic device.

The interactive app 234 is an app which generates interactive traffic which needs to be transmitted and received in real time and may include the plurality of apps 235-1 to 235-N. In this case, the interactive app 234 is an app which generates traffic that needs to be transmitted and received immediately or within several seconds for provision of a service when the user requests the service, and may include, for example, a web browser app, a video viewing app, a music listening app, a game app, and the like.

The delay-tolerant app 236 is an app that is performed by the request of the user or the server 250 to generate delay-tolerant traffic and may include a plurality of apps 237-1 to 237-N. The delay-tolerant app 236 is an app for generating traffic which is not problematic when the user uses a relevant service even through data transmission and reception for provision of the requested service is performed, not immediately, but after several seconds or several hours when the user requests the service, and may include, for example, an email app, a podcast download app, a cloud synchronization app, a content upload/download app, a software update app, and the like. The delay-tolerant app 236 may request traffic transmission and reception from the scheduler 200 when an event needing traffic transmission and reception occurs. In this case, the delay-tolerant app 236 may include a permissible delay time for relevant traffic in the signal requesting traffic transmission and reception which is transmitted to the scheduler 200. For example, when an email app is performed and an email transmission is requested by the user, the email app may inform the scheduler 200 of generation of the email transmission event along with information representing that the email needs to be transmitted within 20 minutes. The delay-tolerant app 236 may provide the location of content to be transmitted to the scheduler 210 and provides the content to be transmitted to the scheduler 210 as illustrated in FIGS. 3A, 3B, and 3C.

Figure 3A:
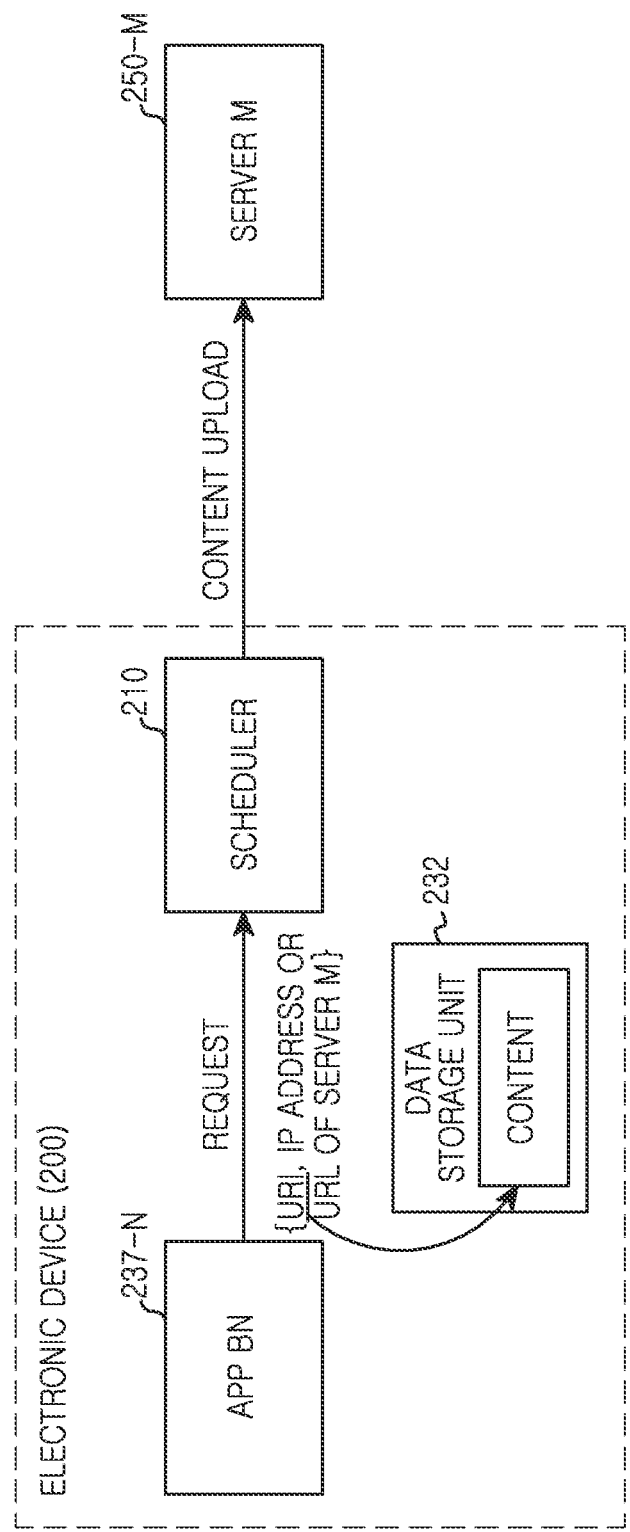
FIGS. 3A, 3B, and 3C illustrate a method for transmitting and receiving content in an electronic device according to an embodiment of the present disclosure.
Figure 3B:
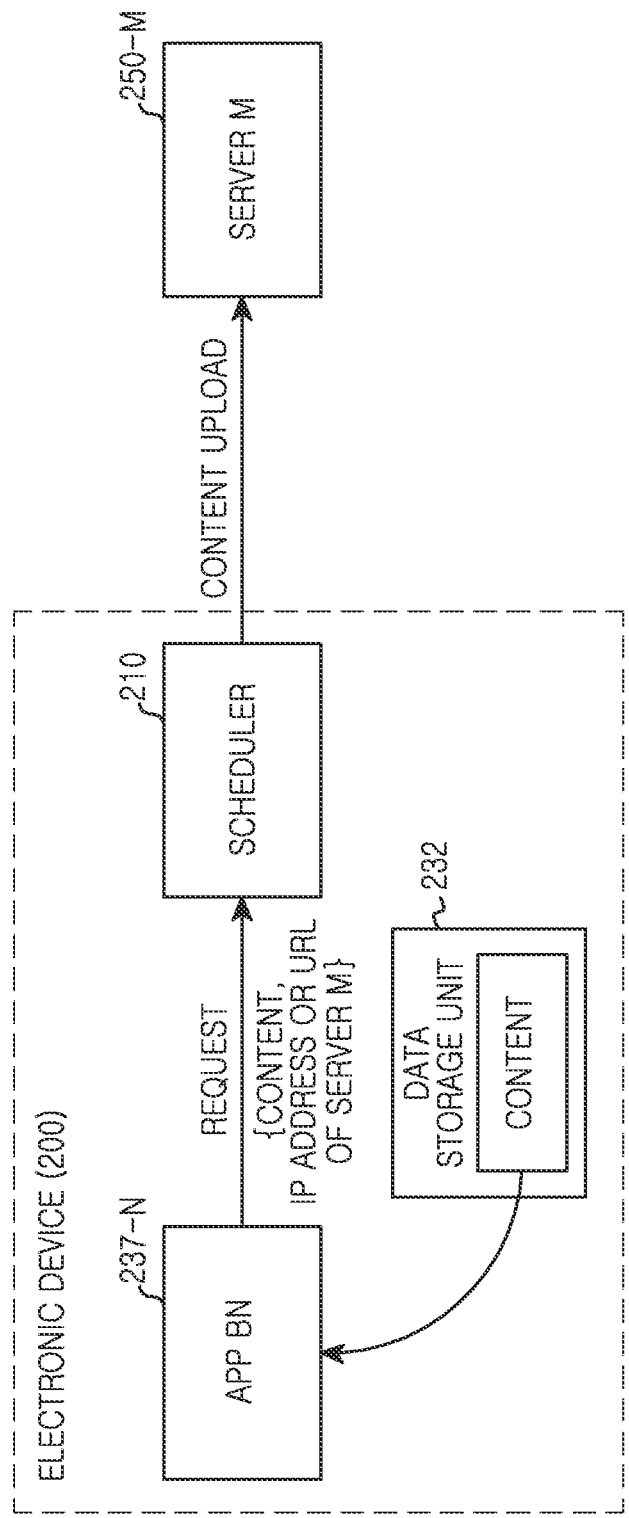
Figure 3C:
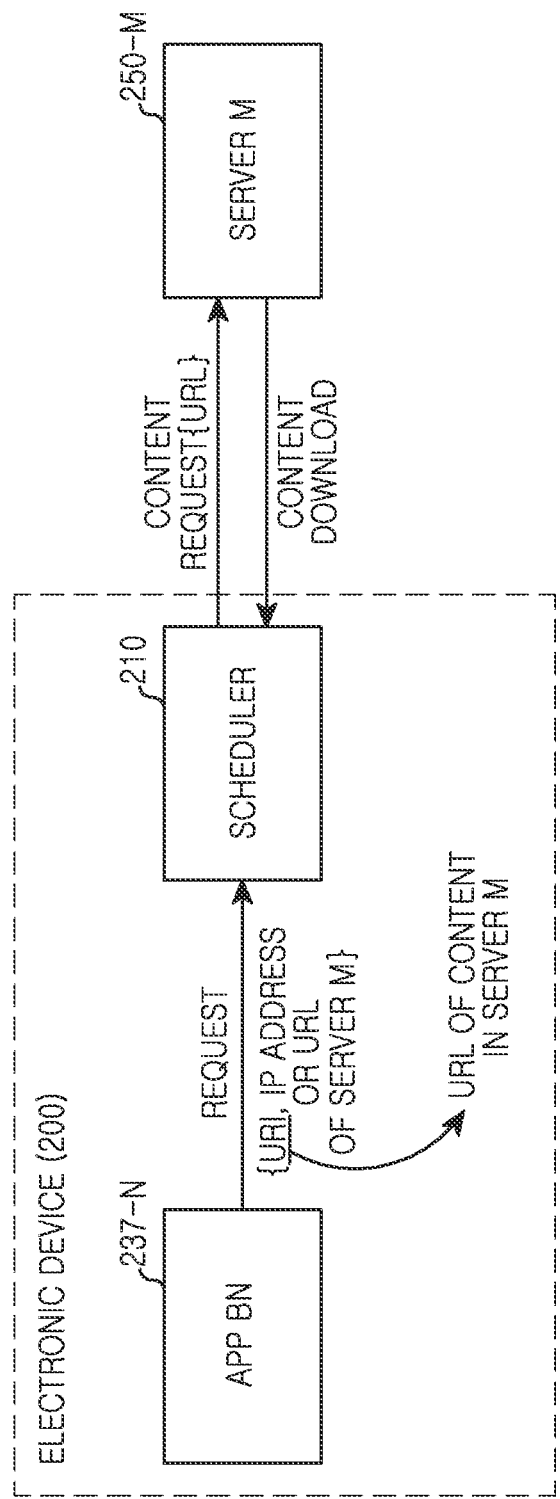

FIGS. 3A, 3B, and 3C are diagrams illustrating a method for transmitting and receiving content in an electronic device according to an embodiment of the present disclosure.

Referring to FIG. 3A, according to an embodiment of the present disclosure, an app BN 237-N may transmit a signal requesting traffic transmission and reception which includes a Uniform Resource Identifier (URI) representing the location of content to be uploaded to the server M 250-M, the Internet Protocol (IP) address or a Uniform Resource Locator (URL) of the server M 250-M to the scheduler 210. In this case, the scheduler 210 temporarily stores the signal requesting traffic transmission and reception until traffic is generated by the interactive app 234. When traffic is generated by the interactive app 234, the scheduler 210 reads out the signal requesting traffic transmission and reception temporarily stored in the buffer and directly reads out content stored in the data storage unit 232 based on a URI included in the signal requesting traffic transmission and reception to upload content to the server M 250-M.

Referring to FIG. 3B, according to another embodiment of the present disclosure, an app BN 237-N may directly read out content to be uploaded to the server M 250-M from the data storage unit 232, and transmit the content and the signal requesting traffic transmission and reception which includes the IP address or URL of the server M 250-M to the scheduler 210. In this case, the scheduler 210 temporarily stores the signal requesting traffic transmission and reception and content until traffic is generated by the interactive app 234. When the traffic is generated by the interactive app 234, the scheduler 210 may read out the signal requesting traffic transmission and reception and content temporarily stored in the buffer and upload the content to the server M 250-M.

Referring to FIG. 3C, according to another embodiment of the present disclosure, an app BN 237-N may transmit the signal requesting traffic transmission and reception which includes a URI representing the location of content to be downloaded from the server M 250-M, the IP address or URL of the server M 250-M to the scheduler 210. In this case, the scheduler 210 temporarily stores the signal requesting traffic transmission and reception until traffic is generated by the interactive app 234. When the traffic is generated by the interactive app 234, the scheduler 210 may read out the signal requesting traffic transmission and reception temporarily stored in the buffer, and transmit URI of content to the server M 250-M to download the content from the server M 250-M.

The transceiver unit 240 transmits and receives traffic generated in the electronic device 200. More particularly, the transceiver unit 240 transmits and receives traffic generated in the electronic device 200 under the control of the scheduler 210 based on Transmission Control Protocol/Internet Protocol (TCP/IP).

The server 250 connects to the electronic device 200 and uploads content from the electronic device 200 or downloads content to the electronic device 200. The server 250 may be configured by a plurality of servers 250-1 to 250-M respectively corresponding to the plurality of apps included in the electronic device and may be one server.

Figure 4:
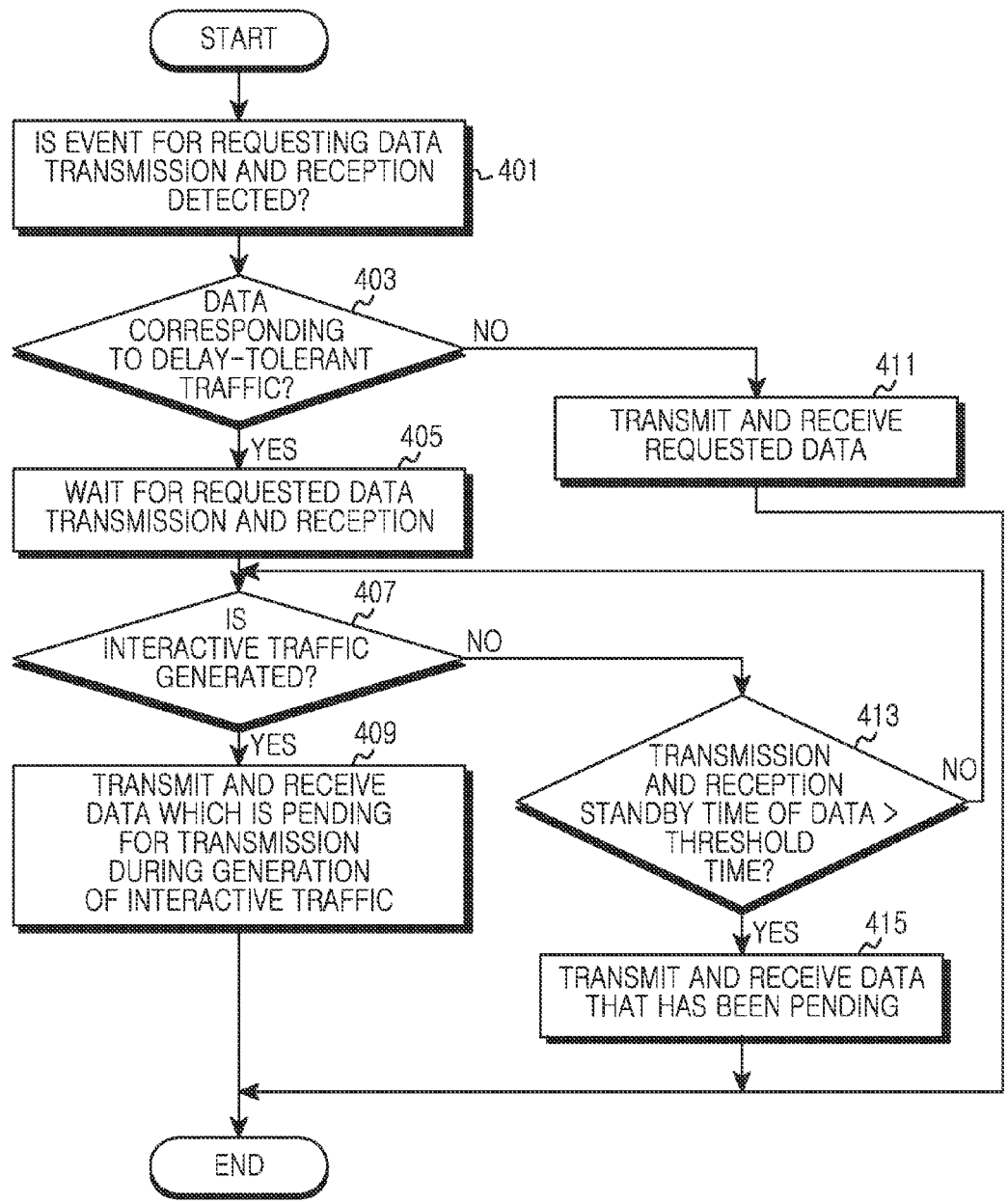
FIG. 4 is a flowchart illustrating a process of controlling delay-tolerant traffic in an electronic device according to an embodiment of the present disclosure.

FIG. 4 is a flowchart illustrating a process of controlling delay-tolerant traffic in an electronic device according to an embodiment of the present disclosure.

Referring to FIG. 4, the electronic device 200 detects generation of a data transmission and reception event in operation 401 and examines whether data to be transmitted and received is data corresponding to delay-tolerant traffic in operation 403. For example, the electronic device 200 examines whether the data corresponds to interactive traffic that needs to be transmitted and received in real-time or whether the data corresponds to delay-tolerant traffic of which the delay is permissible for several seconds to several hours. In this case, the electronic device may identify an app that generates the data and examine whether the data is interactive traffic or delay-tolerant traffic. If it is determined in operation 403 that the data to be transmitted and received does not correspond to delay-tolerant traffic, the electronic device immediately transmits and receives the data in operation 411. Thereafter, the electronic device ends the process according to the embodiment of the present disclosure.

On the other hand, if it is determined in operation 403 that the data to be transmitted and received corresponds to delay-tolerant traffic, the electronic devices waits for the transmission and reception of the data in operation 405 and examines whether interactive traffic that needs to be transmitted and received in real-time is generated in operation 407.

If it is determined in operation 407 that the interactive traffic is generated, the electronic device transmits and receives data that is pending during transmission and reception of the interactive traffic in operation 409. Thereafter, the electronic device ends the process according to the embodiment of the present disclosure.

On the other hand, if it is determined in operation 407 that the interactive traffic is not generated, the electronic device examines whether a transmission and reception standby time of the data that is pending is larger than a threshold time, that is, a permissible delay time in operation 413. Herein, the transmission and reception standby time may be measured based on a time point at which the data transmission and reception event is generated. In addition, the threshold time representing a permissible delay time may be previously set by a designer or a user and may be set differently for respective apps corresponding to data. If it is determined in operation 413 that the transmission and reception standby time of the data that is pending is smaller than or equal to the threshold time, the electronic device continuously returns to operation 407 and continuously examines whether the interactive traffic is generated. On the other hand, if it is determined in operation 413 that the transmission and reception standby time of the data that is pending is larger than the threshold time, the electronic device transmits and receives the data in operation 415. For example, when the transmission and reception standby time of the data requested for transmission and reception is smaller than or equal to the preset threshold time, the electronic device waits for generation of interactive traffic continuously and, when the transmission and reception standby time of the data requested for transmission and reception exceeds the preset threshold time, the electronic device transmits and receives the data even through the interactive traffic is not generated in order to transmit and receive the data requested for transmission and reception during generation of the interactive traffic.

Figure 5A:
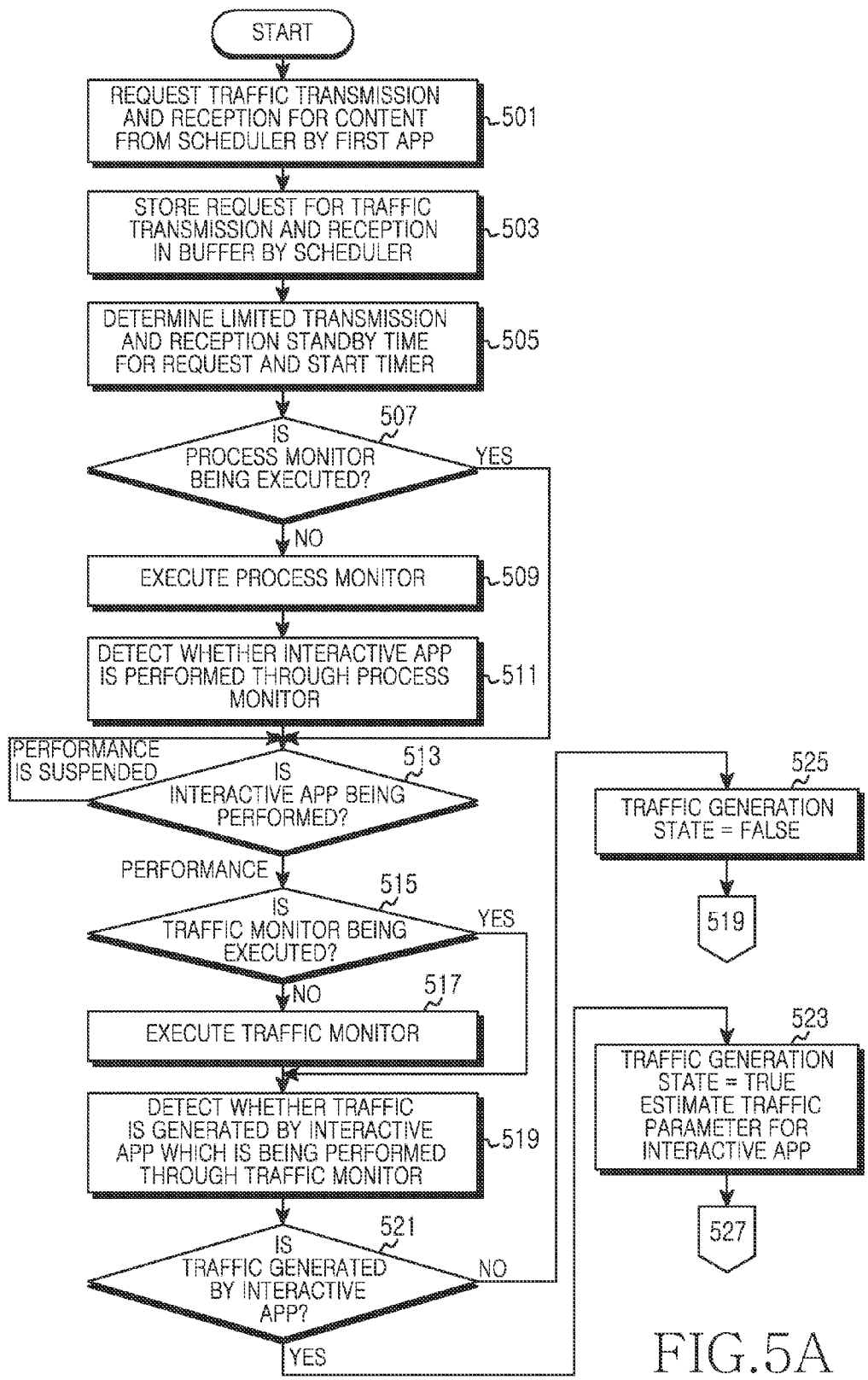
FIGS. 5A and 5B are flowcharts illustrating a specific process of controlling delay-tolerant traffic in an electronic device according to an embodiment of the present disclosure.
Figure 5B:
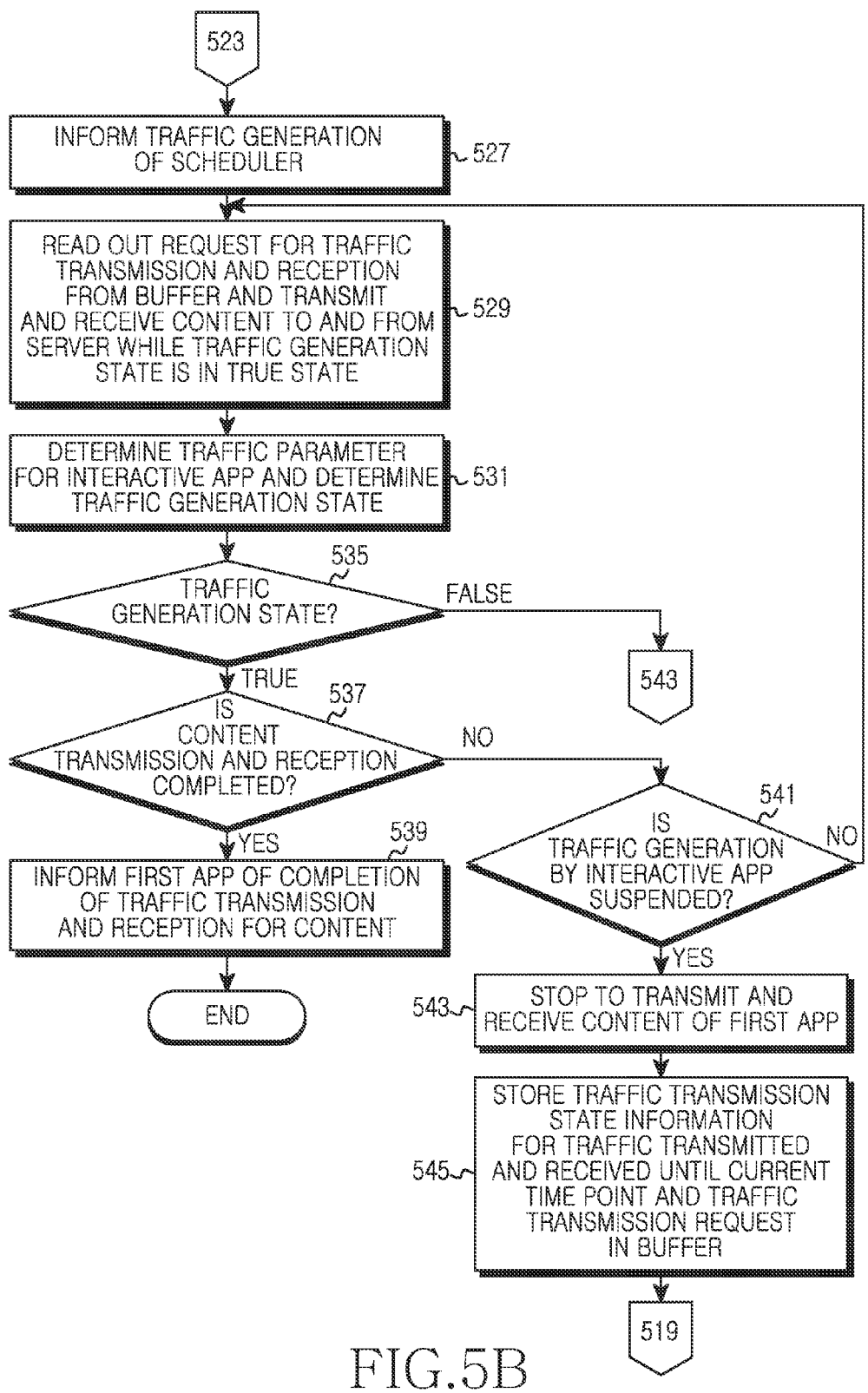

FIGS. 5A and 5B are flowcharts illustrating a specific process of controlling delay-tolerant traffic in an electronic device according to an embodiment of the present disclosure.

Referring to FIGS. 5A and 5B, in operation 501, a first app of the electronic device requests the transmission and reception of traffic for content from a scheduler. In this case, it is assumed that the first app is an app for generating delay-tolerant traffic.

Thereafter, in operation 503, the scheduler of the electronic device stores the request for transmission and reception of traffic which is received from the first app and, in operation 505, sets a permissible delay time for the request to a threshold time and starts a timer for measuring the permissible delay time. Although not illustrated in FIGS. 5A and 5B, the scheduler transmits and receives relevant content regardless of traffic generation by an interactive app when the timer has expired in a case where the content is pending for transmission.

Thereafter, the scheduler of the electronic device examines whether a process monitor is being executed in operation 507. If it is determined in operation 507 that the process monitor is not being executed, the scheduler executes the process monitor in operation 509 and detects whether the interactive app is performed through the performed process monitor in operation 511. If it is determined in operation 507 that the process monitor is being executed, the scheduler directly proceeds to operation 513 and detects whether the interactive app is performed through the executed process monitor in operation 511.

Thereafter, the process monitor of the electronic device determines whether the interactive app is performed or its performance is suspended based on a detection result in operation 513. If it is determined in operation 513 that the interactive app's performance is suspended, the process monitor periodically performs operation 513 to detect whether the interactive app is performed.

On the other hand, if it is determined in operation 513 that the interactive app is performed, the process monitor examines whether a traffic monitor is executed in operation 515. If it is determined in operation 515 that the traffic monitor is not executed, the process monitor executes the traffic monitor in operation 517 and detects whether traffic is generated by the interactive app, which is being performed, through the traffic monitor in operation 519. On the other hand, if it is determined in operation 515 that the traffic monitor is executed, the process monitor directly proceeds to operation 519 and detects whether traffic is generated by the interactive app through the traffic monitor which is being executed in operation 519.

Thereafter, the traffic monitor determines whether traffic is generated by the interactive app which is currently being performed based on a detection result in operation 521. For example, the traffic monitor examines whether traffic is already generated by the interactive app which is being performed, or whether traffic starts to be generated or is not generated by the interactive app. If it is determined in operation 521 that traffic is not generated by the interactive app, the traffic monitor sets a traffic generation state to a "False" in operation 525 and returns to operation 519. In operation 519, the traffic monitor continuously detects whether traffic is generated by the interactive app. Herein, the traffic generation state may represent whether delay-tolerant traffic data generated in operation 501 is allowed to be transmitted and received. For example, when the traffic generation state is in the "False" state, the traffic generation state may represent that the delay-tolerant traffic data is not allowed to be transmitted and received. When the traffic generation state is in a "True" state, the traffic generation state may represent that the delay-tolerant traffic data is allowed to be transmitted and received.

On the other hand, if it is determined in operation 521 that traffic is generated by the interactive app, the traffic monitor sets the traffic generation state to the "True" state and determines a traffic parameter for the interactive app in operation 523. Herein, the traffic parameter may include a parameter representing throughput, a delay, a jitter, a socket receive buffer state (for example, size of data stored in the socket receive buffer), and the like.

Thereafter, the traffic monitor informs the scheduler of traffic generation in operation 527. In operation 529, the scheduler reads out the request for transmission and reception of traffic of the first app from the buffer and transmits and receives content requested for transmission and reception to and from a relevant server while the traffic generation state is in the "True" state. In operation 531, the scheduler controls the traffic monitor, determines the traffic parameter for the interactive app, and re-determines the traffic generation state based on the traffic parameter determined at a current time and a traffic parameter determined at a previous time. For example, the scheduler periodically determines whether the traffic transmission and reception quality of the interactive app is degraded based on the traffic parameter which is periodically determined and re-determines the traffic generation state according to a determination result. For example, when it is determined that the traffic transmission and reception quality of the interactive app is degraded, the traffic generation state is determined to be in the "False" state, and when it is determined that the traffic transmission and reception quality of the interactive app is not degraded, the traffic generation state is determined to be in the "True" state. In this case, the method for re-determining the traffic generation state based on the traffic parameter will be described with reference to FIG. 6.

If it is determined in operation 535 that the traffic generation state is identified and re-determined to be in the "False" state, the scheduler stops to transmit and receive content of the first app in operation 543 and temporarily stores information about the transmission state of content transmitted and received until a current time and a request for traffic transmission in the buffer in operation 545 to return to operation 519. In this time, the buffer may be different from or be identical to the buffer of operation 503.

On the other hand, if it is determined in operation 535 that the traffic generation state is re-determined to be in the "True" state, the scheduler examines whether the content transmission and reception of the first app is completed in operation 537. If it is determined in operation 537 that the content transmission and reception of the first app is not completed, the scheduler proceeds to operation 541 while continuously performing the content transmission and reception of the first app and examines whether the traffic generation by the interactive app is suspended. If it is determined in operation 541 that the traffic generation by the interactive app is not suspended, the scheduler returns to operation 529 and performs subsequent operations.

On the other hand, if it is determined in operation 541 that the traffic generation state by the interactive app is suspended, the scheduler stop to transmit and receive the content of the first app in operation 543, and temporarily stores information about the transmission state of content transmitted until a current time point and the traffic transmission request in the buffer to return to operation 519. When the traffic generation by the interactive app is stopped, the traffic generation state is set to the "False" state by the traffic monitor.

If it is determined in operation 537 that the content transmission and reception of the first app is completed, the scheduler informs the first app of completion of the traffic transmission and reception for the content in operation 539. In this case, the scheduler informs completion of content transmission and reception of the first app, thereby stopping to execute the traffic monitor and the process monitor.

Thereafter, the electronic device ends the process according to the embodiment of the present disclosure.

Figure 6:
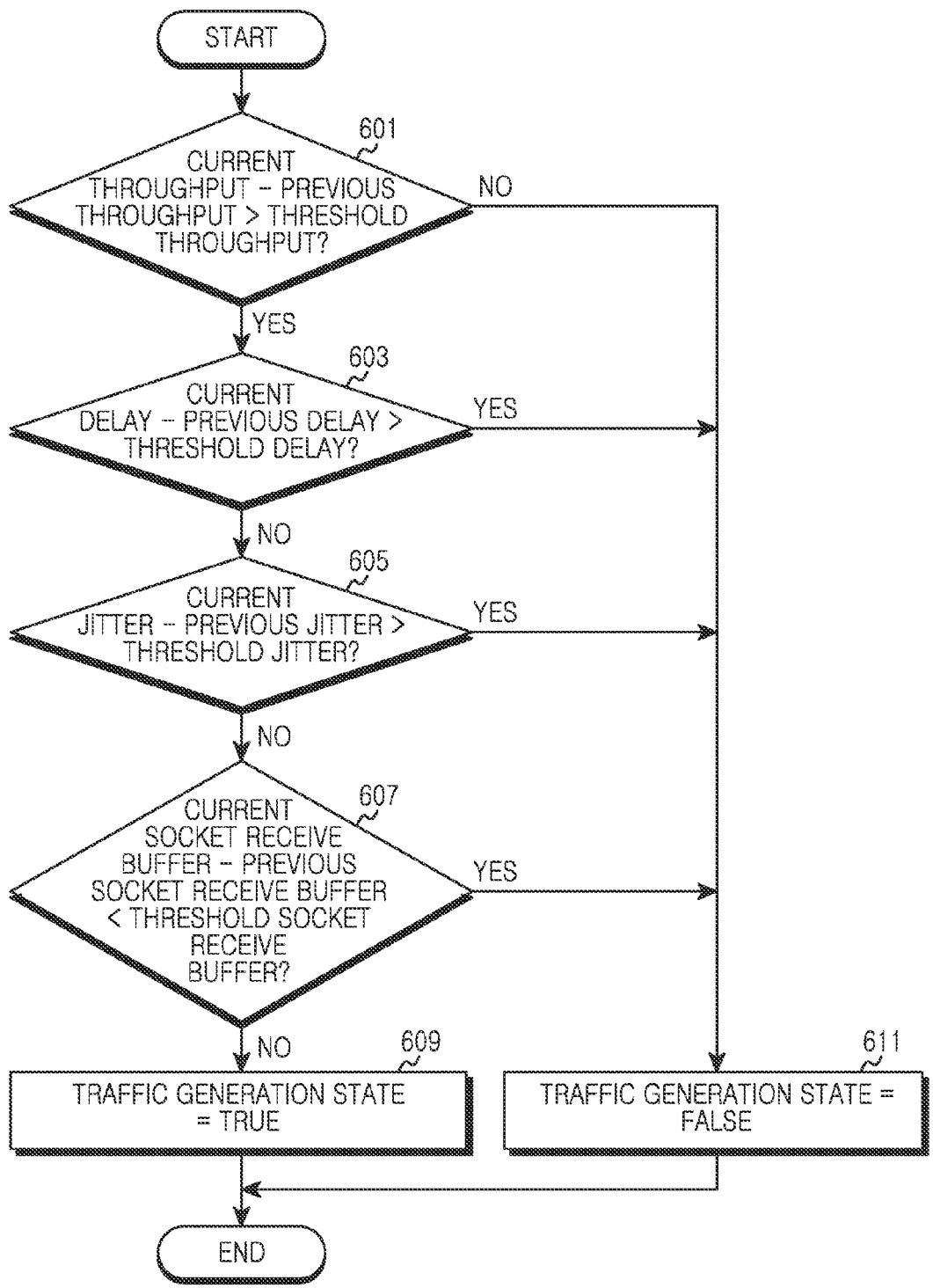
FIG. 6 is a flowchart illustrating a process of determining a traffic generation state in an electronic device according to an embodiment of the present disclosure.

FIG. 6 is a flowchart illustrating a process of determining a traffic generation state in an electronic device according to an embodiment of the present disclosure.

Referring to FIG. 6, in operation 601, the electronic device calculates a difference between throughput at a current time and throughput at a previous time for traffic of an interactive app and examines whether the calculated difference value is smaller than a threshold throughput. If it is determined in operation 601 that the calculated difference value is smaller than the threshold throughput, the electronic device determines that traffic transmission and reception quality of the interactive app is degraded due to delay-tolerant traffic and sets the traffic generation state to a "False" in operation 611.

On the other hand, if it is determined in operation 601 that the calculated difference value is larger than or equal to the threshold throughput, the electronic device calculates a difference time between a processing delay time at a current time and a processing delay time at a previous time for traffic of the interactive app and examines whether the difference time is larger than a threshold delay time in operation 603. If it is determined in operation 603 that the calculated difference value is larger than the threshold delay time, the electronic device determines that traffic transmission and reception quality of the interactive app is degraded due to delay-tolerant traffic and sets the traffic generation state to a "False" in operation 611.

On the other hand, if it is determined in operation 603 that the difference time is smaller than or equal to the threshold delay time, the electronic device calculates a difference value between a jitter value at a current time and a jitter value at a previous time for traffic of the interactive app and examines whether the difference value is larger than a threshold jitter value in operation 605. If it is determined in operation 605 that the jitter difference value is larger than the threshold jitter value, the electronic device determines that traffic transmission and reception quality of the interactive app is degraded due to delay-tolerant traffic and sets the traffic generation state to a "False" in operation 611.

On the other hand, if it is determined in operation 605 that the jitter difference value is smaller than or equal to the threshold jitter value, the electronic device calculates a difference between the size of data stored in a socket receive buffer at a current time and the size of data stored in the socket receive buffer at a previous time for traffic of the interactive app and examines whether the difference value is smaller than a threshold size value in operation 607. If it is determined in operation 607 that the size difference value is smaller than the threshold size value, the electronic device determines that traffic transmission and reception quality of the interactive app is degraded due to delay-tolerant traffic and sets the traffic generation state to a "False" in operation 611.

If it is determined in operation 607 that the size difference value is larger than or equal to the threshold size value, the electronic device determines that traffic transmission and reception quality of the interactive app is not degraded due to delay-tolerant traffic and sets the traffic generation state to a "True" in operation 609.

Herein, the traffic generation state may represent whether traffic of the delay-tolerant app is allowed to be transmitted and received. For example, when the traffic generation state is determined to be in the "False" state, the traffic generation state may represent that the delay-tolerant traffic data is not allowed to be transmitted and received. When the traffic generation state is determined to be in the "True" state, the traffic generation state may represent that the delay-tolerant traffic data is allowed to be transmitted and received.

Thereafter, the electronic device ends the process according to the embodiment of the present disclosure.

Figure 7:
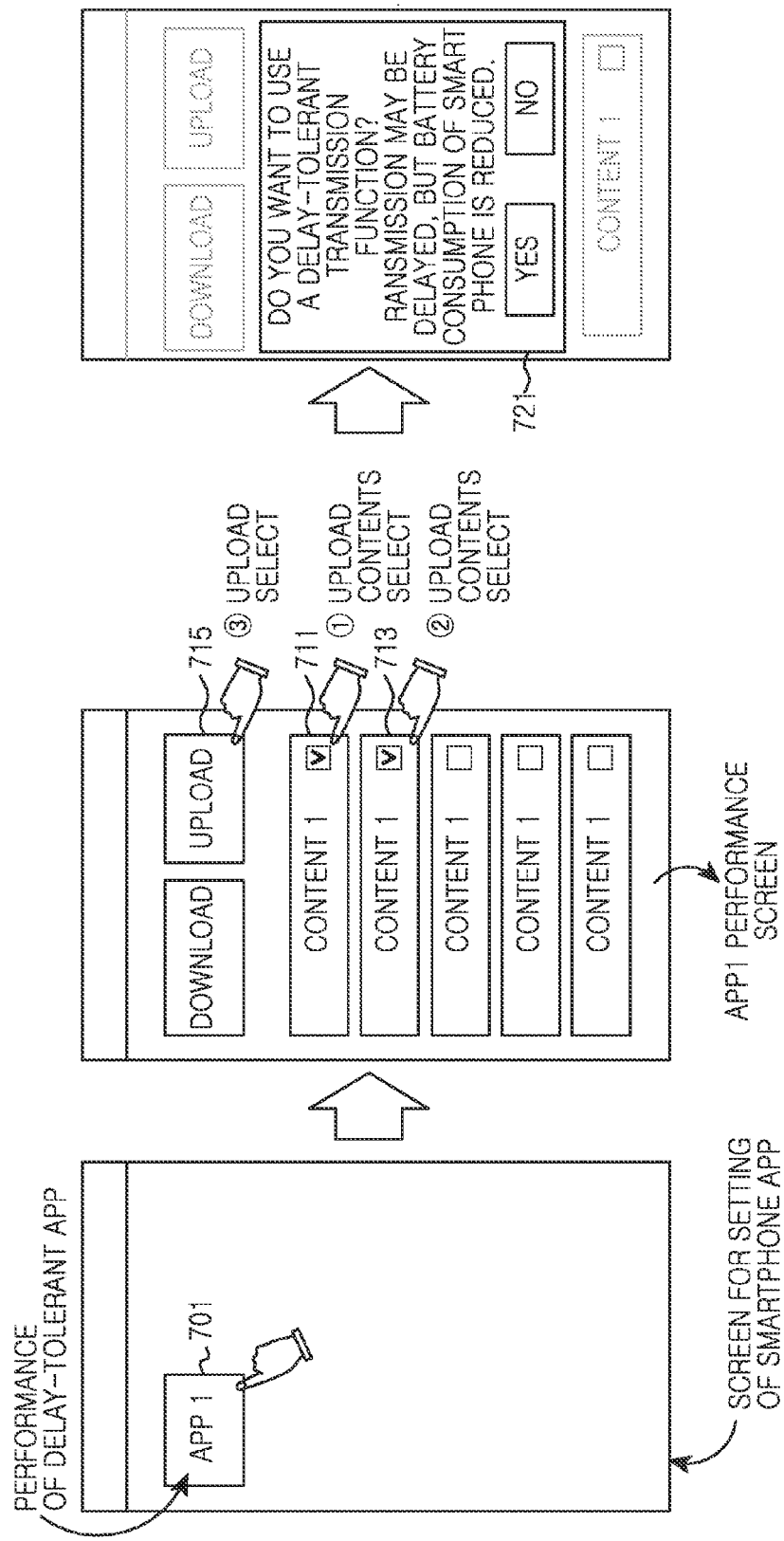
FIG. 7 illustrates a screen configuration of requesting user settings for whether to use a function of controlling delay-tolerant traffic in an electronic device according to an embodiment of the present disclosure.

FIG. 7 illustrates a screen configuration of requesting user settings for whether to use a function of controlling delay-tolerant traffic in an electronic device according to an embodiment of the present disclosure.

Referring to FIG. 7, the electronic device according to various embodiments of the present disclosure may or may not perform a traffic control function according to user settings. When an app 1 701 for performing a function of uploading/downloading content is selected and performed and a function for uploading 715 a content 1 711 and a content 2 713 stored in the electronic device to the server is selected, the electronic device may display a message 721 requesting settings for whether to use a function for delaying and transmitting content and delay and transmit content according to the user settings as described with reference to FIGS. 1, 2, 3A, 3B, 3C, 4, 5A, 5B, and 6 or immediately transmit content without delay. In this case, a message requesting settings may include a message representing that content transmission is delayed but battery consumption is reduced.

Figure 8A:
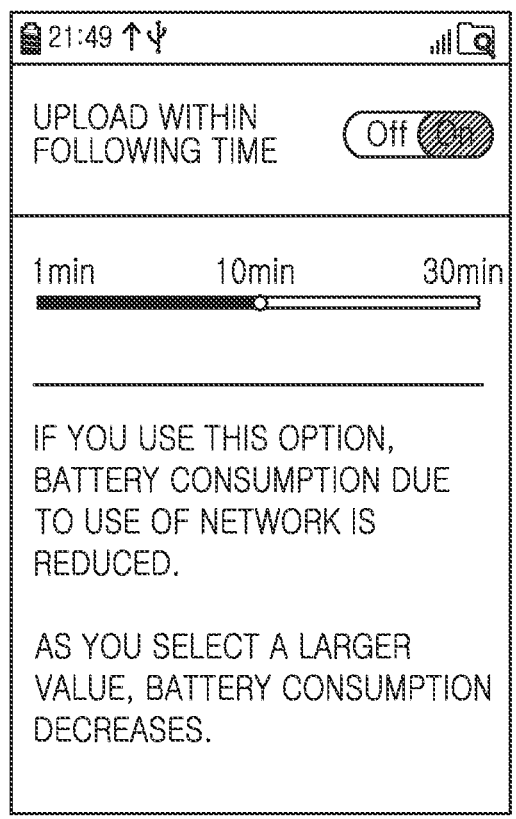
FIGS. 8A and 8B illustrate a screen configuration for setting a delay tolerant time in an electronic device according to an embodiment of the present disclosure.
Figure 8B:
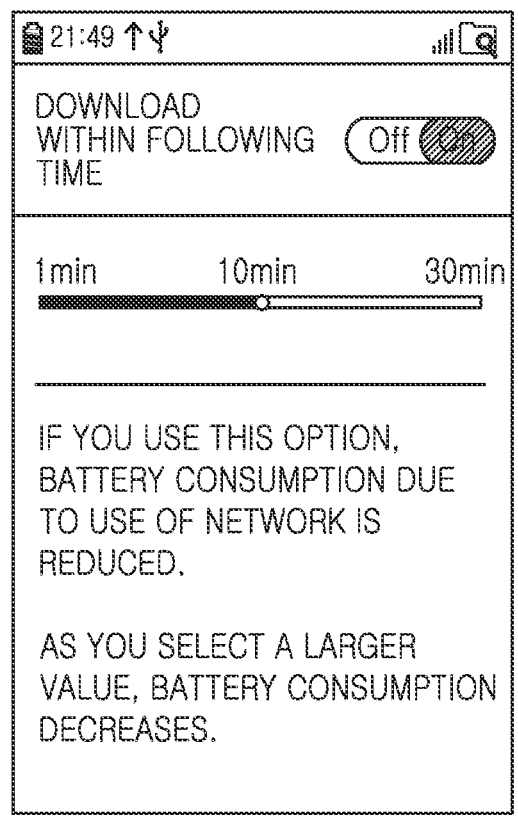

FIGS. 8A and 8B illustrate a screen configuration for setting a delay tolerant time in an electronic device according to an embodiment of the present disclosure.

Referring to FIGS. 8A and 8B, the electronic device may provide a user interface for requesting a setting of a permissible delay time of a relevant content and receive the delay tolerant time from a user. The electronic device may request settings of permissible delay times for respective pieces of content and receive different permissible delay times for respective pieces of content.

For example, as illustrated in FIG. 8A, the electronic device may provide an interface for setting or adjusting a permissible upload delay time for content requested for upload in order for the user to set the permissible upload delay time.

As illustrated in FIG. 8B, the electronic device may provide an interface for setting or adjusting a permissible download delay time for content requested for download in order for the user to set the permissible download delay time. Although a minimum permissible delay time is illustrated as being 1 minute and a maximum permissible delay time is illustrated as being 30 minutes, the minimum permissible delay time and the maximum permissible delay time may be changed in the user settings.

As illustrated in FIGS. 8A and 8B, the electronic device may enable the user to set a permissible delay time to reduce battery consumption due to connection to a network and display a message representing that, as the permissible delay time is set to be larger, battery consumption decreases. In addition, the electronic device may provide a user interface for enabling the user to set whether to use a traffic control function for relevant content. For example, as illustrated in FIGS. 8A and 8B, an on/off setting interface for setting whether to use a traffic control function for relevant content may be provided.

Figure 9:
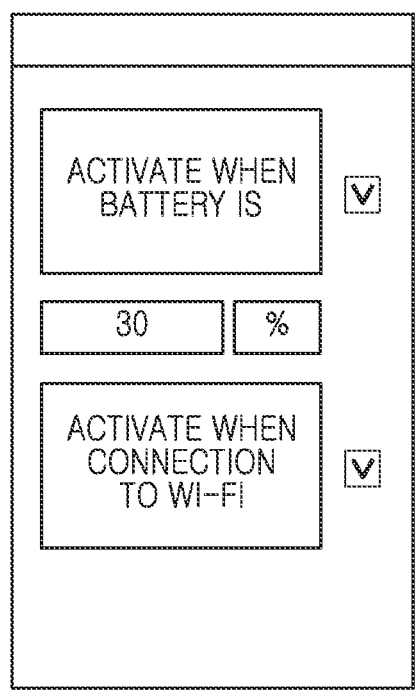
FIG. 9 illustrates a screen configuration for setting conditions for performing a controlling delay-tolerant traffic in an electronic device according to an embodiment of the present disclosure.

FIG. 9 illustrates a screen configuration for setting conditions for performing a function of controlling delay-tolerant traffic in an electronic device according to an embodiment of the present disclosure.

Referring to FIG. 9, a condition for whether to perform a traffic delay function of a delay-tolerant app may be set in the electronic device according to the embodiment of the present disclosure. For example, the electronic device may provide an interface for setting that the traffic delay function of the delay-tolerant app is performed according to a battery remaining amount and whether the electronic device is connected to a wireless Local Area Network (LAN). For example, as illustrated in FIG. 9, the electronic device may provide an interface for enabling a user to set whether to perform the traffic delay function of the delay-tolerant app in a case where the battery remaining amount is equal to or lower than 30%. In addition, the electronic device may provide an interface for enabling a user to change and set a threshold remaining amount for a battery remaining amount. The electronic device may provide an interface for enabling a user to set whether to perform the traffic delay function of the delay-tolerant app in the case where the electronic device is connected to the wireless LAN.

According to the various embodiments of the present disclosure, the electronic device delays delay-tolerant traffic until interactive traffic is generated and transmits and receives delay-tolerant traffic, thereby reducing current consumption by reducing a number of times tail-end energy occurs and thus, increasing a battery run time.

The operations according to various embodiments of the present disclosure may be implemented by a single control unit. In this case, program commands for performing operations implemented by various computers may be recorded in a non-transitory computer-readable recording medium. The computer-readable recording medium may include program commands, data tiles, and data structures in singularity or in combination. The program commands may be those that are especially designed and configured for the present disclosure, or may be those that are publicly known and available to those skilled in the art. A non-transitory computer readable recording medium is any data storage device that can store data which can be thereafter read by a computer system. Examples of the non-transitory computer-readable recording medium include magnetic recording media, such as hard disks, floppy disks and magnetic tapes, optical recording media, such as Compact Disc-Read Only Memories (CD-ROMs) and Digital Video Disks (DVDs), magneto-optical recording mediums, such as floptical disks, and hardware devices, such as ROMs, Random Access Memories (RAMs) and flash memories that are especially configured to store and execute program commands. Examples of the program commands include machine language codes that may be generated by a compiler, and high-level language codes that may be executed by a computer by using an interpreter. When all or some of a base station or a relay described in the present disclosure is implemented by a computer program, a non-transitory computer-readable recording medium storing the computer program is also included in the present disclosure. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for controlling data in an electronic device, the method comprising:
   identifying a request for a transmission of first data;
   if a condition is satisfied, delaying the transmission of the first data, and in response to identifying a generation of second data, transmitting the first data and the second data based on a transmission quality of the second data during a state in which the second data is being generated; and
   if the condition is not satisfied, transmitting the first data,
   wherein the first data is associated with a delay-tolerant application,
   wherein the second data is associated with a delay-intolerant application,
   wherein the transmitting of the first data is stopped in response to a reduction in the transmission quality of the second data,
   wherein the reduction in the transmission quality of the second data is determined based on a change of at least one parameter for the delay-intolerant application with respect to a time, and
   wherein the condition comprises at least one of whether a remaining amount of battery in the electronic device is below a threshold, or whether the electronic device is connected to a wireless local area network (LAN).

2. The method of claim 1, further comprising:
   transmitting the first data after a permissible delay time for the first data elapses, if the second data is not generated.

3. The method of claim 1,
   wherein the delay-tolerant application comprises at least one of an email application, a cloud service application, a content upload application, a content download application, or a software update application, and
   wherein the delay-intolerant application comprises at least one of a web-browser application, a video viewing application, a music listening application, or a game application.

4. The method of claim 1, further comprising:
   determining the at least one parameter for the delay-intolerant application,
   wherein the at least one parameter comprises at least one of throughput, a delay time, jitter, or a size of data stored in a socket receive buffer.

5. The method of claim 1, further comprising:
   determining a first value of the at least one parameter at a first time point and a second value of the at least one parameter at a second time point; and determining the reduction in the transmission quality of the second data based on a difference between the first value and the second value.

6. The method of claim 1, further comprising:
determining that the second data is generated if a second process delay time for the second data exceeds a second permissible delay time for the second data, while a first process delay time for the first data does not exceed a first permissible delay time for the first data.

7. The method of claim 1, further comprising:
displaying a user interface (UI) for receiving an input regarding a setting of the condition,
wherein the setting comprises at least one of whether to delay the transmission of the first data according to the remaining amount of the battery, the threshold, or whether to delay the first data according to a LAN connection of the electronic device.

8. An electronic device for controlling data, the electronic device comprising:
a transceiver; and
a scheduler configured to:
identify a request for a transmission of first data, and if a condition is satisfied, delay the transmission of the first data,
wherein the transceiver is further configured to, in response to identifying a generation of second data, transmit the first data and the second data based on a transmission quality of the second data during a state in which the second data is being generated,
wherein, if the condition is not satisfied, the transceiver is further configured to transmit the first data,
wherein the first data is associated with a delay-tolerant application,
wherein the second data is associated with a delay-intolerant application,
wherein the transmitting of the first data is stopped in response to a reduction in the transmission quality of the second data,
wherein the reduction in the transmission quality of the second data is determined based on a change of at least one parameter for the delay-intolerant application with respect to a time, and
wherein the condition comprises at least one of whether a remaining amount of battery in the electronic device is below a threshold, or whether the electronic device is connected to a wireless local area network (LAN).

9. The electronic device of claim 8, wherein the transceiver is further configured to transmit the first data after a permissible delay time for the first data elapses, if the second data is not generated.

10. The electronic device of claim 8,
wherein the delay-tolerant application comprises at least one of an email application, a cloud service application, a content upload application, a content download application, or a software update application, and
wherein the delay-intolerant application comprises at least one of a web-browser application, a video viewing application, a music listening application, or a game application.

11. The electronic device of claim 8,
wherein the scheduler is further configured to determine the at least one parameter for the delay-intolerant application, and wherein the at least one parameter comprises at least one of throughput, a delay time, jitter, or a size of data stored in a socket receive buffer.

12. The electronic device of claim 8, wherein the scheduler is configured to:
determine a first value of the at least one parameter at a first time point and a second value of the at least one parameter at a second time point, and
determine the reduction in the transmission quality of the second data based on a difference between the first value and the second value.

13. The electronic device of claim 8, wherein the scheduler is configured to determine that the second data is generated if a second process delay time for the second data exceeds a second permissible delay time for the second data, while a first process delay time for the first data does not exceed a first permissible delay time for the first data.

14. The electronic device of claim 8, further comprising a display configured to display a user interface (UI) for receiving an input regarding a setting of the condition,
wherein the setting comprises at least one of whether to delay the transmission of the first data according to the remaining amount of the battery, the threshold, or whether to delay the first data according to a LAN connection of the electronic device.

15. A method for controlling data in an electronic device, the method comprising:
identifying an execution of a delay-tolerant application;
identifying a request for a transmission of first data;
displaying a user interface (UI) for receiving an input regarding whether to delay the transmission;
if the transmission of the first data is determined to be delayed based on the input, delaying the transmission of the first data and in response to identifying a generation of second data, transmitting the first data and the second data based on a transmission quality of the second data during a state in which the second data is generated; and
if the transmission of the first data is determined not to be delayed based on the input, transmitting the first data,
wherein the first data is associated with the delay-tolerant application,
wherein the second data is associated with a delay-intolerant application,
wherein the transmitting of the first data is stopped in response to a reduction in the transmission quality of the second data, and
wherein the reduction in the transmission quality of the second data is determined based on at least one parameter for the delay-intolerant application with respect to a time.

16. The method of claim 15, wherein the UI comprises a setting of a permissible delay time for the first data.

17. The method of claim 15, further comprising:
determining a first value of the at least one parameter at a first time point and a second value of the at least one parameter at a second time point; and
determining the reduction in the transmission quality of the second data based on a difference between the first value and the second value.

* * * * *